(12) United States Patent
Gall

(10) Patent No.: US 9,703,372 B2
(45) Date of Patent: Jul. 11, 2017

(54) DISPLAY DEVICE, IN PARTICULAR FOR MOTOR VEHICLE

(71) Applicant: Johnson Controls Automotive Electronics SAS, Cergy Pontoise (FR)

(72) Inventor: Hugues Gall, Orgeval (FR)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 14/348,836

(22) PCT Filed: Oct. 1, 2012

(86) PCT No.: PCT/EP2012/069369
§ 371 (c)(1),
(2) Date: Mar. 31, 2014

(87) PCT Pub. No.: WO2013/045705
PCT Pub. Date: Apr. 4, 2013

(65) Prior Publication Data
US 2015/0049015 A1    Feb. 19, 2015

(30) Foreign Application Priority Data

Oct. 1, 2011 (DE) .................. 10 2011 114 785
Mar. 12, 2012 (FR) ..................... 12 00745

(51) Int. Cl.
*G06F 3/01* (2006.01)
*G02B 27/01* (2006.01)
(Continued)

(52) U.S. Cl.
CPC .............. *G06F 3/013* (2013.01); *B60K 35/00* (2013.01); *G02B 15/00* (2013.01);
(Continued)

(58) Field of Classification Search
None
See application file for complete search history.

(56) References Cited

U.S. PATENT DOCUMENTS

| | | | |
|---|---|---|---|
| 5,214,413 A | 5/1993 | Okabayashi et al. | |
| 6,750,832 B1 * | 6/2004 | Kleinschmidt | B60K 35/00 345/7 |

(Continued)

FOREIGN PATENT DOCUMENTS

| | | |
|---|---|---|
| EP | 2 351 544 A1 | 8/2011 |
| GB | 2 465 786 A | 6/2010 |

(Continued)

OTHER PUBLICATIONS

International Search Report received in PCT/EP2012/069369.
(Continued)

*Primary Examiner* — Carolyn R Edwards
*Assistant Examiner* — Krishna Neupane
(74) *Attorney, Agent, or Firm* — Foley & Lardner LLP

(57) ABSTRACT

A display device, in particular for motor vehicle, includes a projection module and an optical path. The optical path has at least one reflection element, which is designed to reflect at least partially an image originating from the projection module in a normal direction of gaze of a user of the display device. A first configuration of the optical path is applied in a first mode of operation of the display device, and a second configuration of the optical path is applied in a second mode of operation of the display device. In the second mode of operation of the display device, at least a part of the image generated by the projection module is visible to the user of the display device in a magnified manner with respect to the first mode of operation of the display device.

8 Claims, 2 Drawing Sheets

(51) Int. Cl.
*B60K 35/00* (2006.01)
*G02B 15/00* (2006.01)
*G09G 5/00* (2006.01)

(52) U.S. Cl.
CPC ........... *G02B 27/0101* (2013.01); *G09G 5/00* (2013.01); *G02B 2027/014* (2013.01); *G02B 2027/0147* (2013.01); *G09G 2380/10* (2013.01)

(56) References Cited

U.S. PATENT DOCUMENTS

| | | | |
|---|---|---|---|
| 7,561,966 B2 | 7/2009 | Nakamura et al. | |
| 2005/0154505 A1* | 7/2005 | Nakamura | G01C 21/365 701/1 |
| 2006/0071877 A1* | 4/2006 | Kanamori | G02B 17/023 345/7 |
| 2009/0160736 A1 | 6/2009 | Shikita | |
| 2010/0238280 A1* | 9/2010 | Ishii | B60K 35/00 348/77 |
| 2011/0102303 A1* | 5/2011 | Kakizaki | G02B 27/01 345/7 |
| 2011/0134535 A1* | 6/2011 | Box | B60K 35/00 359/630 |

FOREIGN PATENT DOCUMENTS

| | | |
|---|---|---|
| JP | 2001-343929 A | 12/2001 |
| JP | 2003-175744 A | 6/2003 |
| WO | WO-2007/090824 A1 | 8/2007 |
| WO | WO-2010/050459 A1 | 5/2010 |

OTHER PUBLICATIONS

International Preliminary Report on Patentability in PCT/EP2012/069369.
Search Report dated Oct. 30, 2015, in corresponding French application No. 1200745, 6 pages.
Office Action dated Jul. 26, 2016, received in corresponding Japanese application No. 2014-532434 and English translation, 6 pages.

\* cited by examiner

DISPLAY DEVICE, IN PARTICULAR FOR MOTOR VEHICLE

CROSS REFERENCE TO RELATED APPLICATIONS

The present application is a National Stage of International Application No. PCT/EP2012/069369 filed on Oct. 1, 2012, which claims the benefit of German Patent Application No. 10 2011 114 785.7 filed on Oct. 1, 2011 and French Patent Application No. 12/00745 filed on Mar. 12, 2012, the entire disclosures of which are incorporated herein by reference.

The present invention relates to a display device, in particular for a motor vehicle.

Head-up display (HUD) devices are known, in particular with the projection of an image onto a windscreen as described in the document U.S. Pat. No. 5,214,413 or in the document WO 2007/090824 A1. It is advantageous if the projected image, of the head-up display device, can be adapted in a way that is flexible to the various needs of users, in particular drivers of motor vehicles.

A drawback of such devices of the known art consists in the fact that an optical path that makes an image generated by a projection module visible to a user of the display device is generally poorly variable or even non-variable.

The present invention has in particular the object of palliating the drawbacks of the known art, in particular those mentioned above, and also has the object of proposing a display device that is capable of being adapted to various needs of various users of a motor vehicle.

Following the present invention, this object is achieved by a display device, in particular for a motor vehicle, comprising
a projection module and
an optical path
the optical path comprising at least one reflection element,
the reflection element being designed to reflect at least partially an image originating from the projection module in a normal direction of gaze of a user of the display device,
the image originating from the projection module being generated by the projection module,
the display device being designed to be operated in a first mode of operation and in a second mode of operation,
a first configuration of the optical path being applied in the first mode of operation of the display device, and a second configuration of the optical path being applied in the second mode of operation of the display device, and
in the second mode of operation of the display device, at least a part of the image generated by the projection module being visible to the user of the display device in a magnified manner with respect to the first mode of operation of the display device.

On account of such an embodiment of a display device, it is advantageously possible to make the use of the display device more flexible and in particular more suitable for people having special display needs, for example people with impaired visual ability.

A preferred refinement of the invention resides in the fact that in the second mode of operation of the display device, only a part of the image generated by the projection module is visible to the user of the display device.

On account of such an embodiment of a display device, it is advantageously possible according to the present invention that the optical path can be provided, in the first mode of operation of the display device as well as in the second mode of operation of the display device, that the same size of field of view is produced for a driver. The only difference is that, instead of, for example, representing for the user the complete image generated by a projection module, only a part of this image is transmitted by the optical path in the field of view of the user of the display device.

A particularly preferred refinement of the invention resides in the fact that in the second mode of operation of the display device, the whole image generated by the projection module is visible to the user of the display device.

On account of such an embodiment of the display device, it is advantageously possible to represent the whole image generated by the projection module so as to be displayed or projected in the field of view of the user of the display device.

Another preferred refinement of the invention resides in the fact that
the image generated by the projection module is an image comprising a first number of image elements (pixels) in a first direction of the image and comprising a second number of image elements (pixels) in a second direction of the image, and
in the second mode of operation of the display device, a third number of image elements in the first direction of the image and a fourth number of image elements in the second direction of the image is visible to the user of the display device, the third number of image elements being less than the first number of image elements and/or the fourth number of image elements being less than the second number of image elements.

On account of such an embodiment of the display device according to the present invention, it is advantageously possible to produce the optical path in a relatively simple manner so as to simply increase the magnification factor of the optical path while reducing the part of the image generated by the projection module which is transmitted and projected in the field of view of the user of the display device.

A particularly preferred refinement of the invention resides in the fact that the display device comprises a human-machine interface or that the display device is associated with a human-machine interface, and that via the human-machine interface, following an interaction of the user of the display device, an item of selection information is transmitted to the display device such that the display device is operated, either following the first mode of operation, or following the second mode of operation, depending on the item of selection information.

Thus, it is possible to easily change the mode of operation of the display device according to the present invention.

Yet another particularly preferred refinement of the invention resides in the fact that the item of information is generated following identification of the user of the display device.

On account of such an embodiment of the display device according to the present invention, it is advantageously possible to store the preferred mode of operation for various drivers or for various individuals who are users of the display device in such a way that when an individual is identified, the appropriate mode of operation is chosen automatically.

A particularly preferred refinement of the invention resides in the fact that the display device comprises a liquid crystal display (LCD) module.

Another particularly preferred refinement of the invention resides in the fact that the display device comprises a matrix display module.

A particularly preferred refinement of the invention resides in the fact that the reflection element is an element positioned at a distance with respect to a windscreen of the motor vehicle.

Yet another particularly preferred refinement of the invention resides in the fact that the reflection element is designed to be retractable between, on the one hand, a use position of the reflection element, and, on the other hand, a rest position of the reflection element.

Other features and advantages of the invention will become apparent on reading the following description of a particular non-limiting embodiment of the present invention.

BRIEF DESCRIPTION OF THE DRAWINGS

The invention will be better understood thanks to the description below, which relates to preferred embodiments, given by way of non-limiting examples and explained with reference to the appended schematic drawing, wherein.

DESCRIPTION OF THE DRAWINGS

Figure 3:
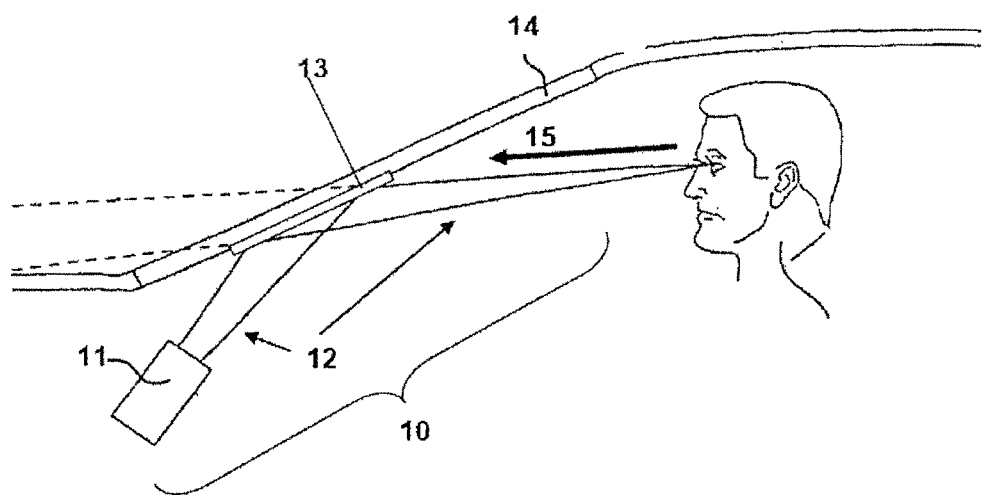
FIG. 3 is a schematic view of a cross-section of a display device according to the present invention.

As shown in FIG. 3 of the appended drawing, a display device 10 according to the present invention comprises a projection module 11 that generates an image in the normal direction of gaze 15 of a user of the display device 10 along an optical path 12. The optical path 12 comprises at least one reflection element 13. In this way, the optical path 12 can comprise a (single) reflection element, as represented in FIG. 3. Moreover, the optical path 12 can also comprise two reflection elements (not represented). Of course, the display device 10 can also comprise—in another variant not represented in the figures—more than two reflection elements 13.

The reflection element 13 can be part of the windscreen 14 of the vehicle. In another preferred variant of the invention, the reflection element 13 is an element positioned relatively close to the windscreen 14, as is represented in FIG. 3. In another preferred variant of the invention (not represented in the figures), the reflection element 13 is an element positioned at a distinct distance with respect to the windscreen 14.

Preferably, the reflection element 13 can be designed to be retractable to between, on the one hand, a use position of the reflection element 13, and, on the other hand, a rest position of the reflection element 13.

The normal direction of gaze 15 is the direction of gaze of a user of the display device 10, in particular a vehicle driver, when the latter views, in particular through the windscreen 14, the outside of the motor vehicle which lies for example in front of the vehicle.

The display device 10 according to the present invention comprises, preferably in the projection module 11, a display module being a Liquid Crystal Display (LCD) module. Moreover, the display module can also be a matrix display module. It is also possible, according to the present invention, to combine a liquid crystal display (LCD) module with a matrix display module, i.e. to use a combined display module comprising a part of the liquid crystal display module and a part of the matrix display module. According to the present invention, in the case of a matrix display module, it is preferable to use a passive matrix display module.

According to the present invention, the display device 10 is designed to be operated in a first mode of operation and in a second mode of operation, the first mode of operation of the display device 10 corresponding to a first configuration of the optical path 12, and the second mode of operation of the display device corresponding to a second configuration of the optical path 12. To do this, the optical path 12 comprises at least one variable element that effects the first and second configuration of the optical path.

According to the present invention, in the second mode of operation of the display device, at least a part of the image generated by the projection module is visible to the user of the display device 10 in a magnified manner with respect to the first mode of operation of the display device. This means that an item of information, for example an item of information corresponding to the state of the vehicle, in particular its speed or other parameters such as indications for the navigation system, can be represented by the display device in a magnified manner, in particular to produce a better view of this information for the user of the display device.

Figure 1:
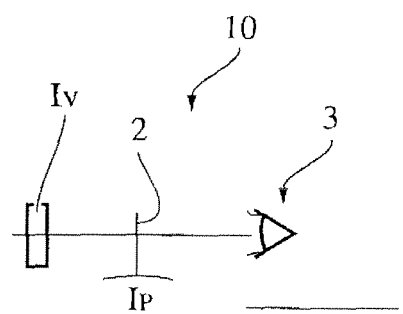
FIG. 1 is a schematic representation of a display device according to the present invention.

In FIG. 1, a user, represented by way of an eye 3, can see a virtual image IV which is produced above a dashboard IP through an optical means 2, in particular a mirror.

Figure 2:
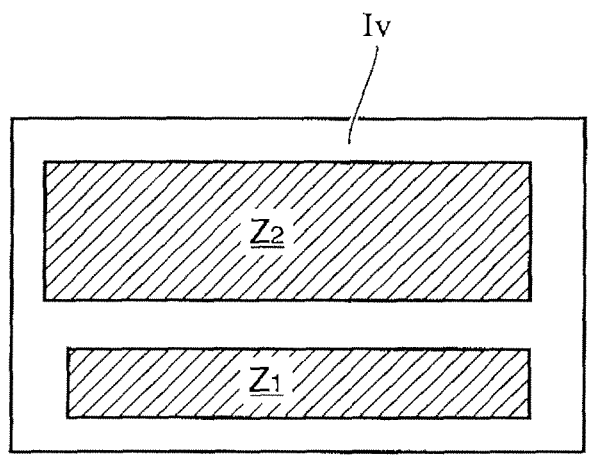
FIG. 2 is a schematic representation of the field of view of a user of the display device according to the present invention with the image projected from the projection module.

As can be seen in FIG. 2, the image or field of view IV of the user of the display device 10 can comprise a first area Z1 and a second area Z2 that are able to represent the same information content in different sizes, in particular in different sizes of figures or signs. For example, in the second area Z2 a magnified representation of an item of information can be represented with respect to an item of information represented in the first area Z1. Thus, it is advantageously possible that the user of the display device 10 can choose two ways of representing the item of information. According to the present invention, it is also proposed that the representation in the first display area Z1 is varied or changed to result in an automatic representation of the item of information in the second display area Z2 when the item of information represented increases in size.

According to the present invention, the first or second mode of operation of the display device 10 is chosen depending on an item of selection information. The item of selection information is preferably obtained using a human-machine interface which is produced as part of the display device or which is produced in association with the display device, in particular by being part of the motor vehicle, in which the display device is mounted. Normally, the user of the display device 10 can, via an interaction of the user with the human-machine interface, change the item of selection information in such a way that another mode of operation of the display device is effected or applied.

According to the present invention, it is also proposed that the visual ability of the user of the display device 10 is measured automatically through a measurement means. Thus, the item of selection information or the item of information about which of the various modes of operation of the display device are applied, can be obtained automatically and without interaction with the user.

The display device 10, according to the present invention, is notably provided as a HUD (head-up display) device.

LIST OF REFERENCE SIGNS 10 display device
2 optical means/mirror 3 eye of a user
IP dashboard
IV virtual image
Z1 first display area
Z2 second display area
11 projection module
12 optical path
13 reflection element
14 windscreen
15 normal direction of gaze of a user of the display device

The invention claimed is:

1. A display device, in particular for a motor vehicle, comprising
a projection module; and
an optical path
the optical path comprising at least one reflection element,
the reflection element being designed to reflect at least partially an image originating from the projection module in a normal direction of gaze of a user of the display device,
the image originating from the projection module being generated by the projection module,
wherein the display device is designed to be operated in a first mode of operation corresponding to a first configuration of the optical path,
wherein the display device is designed to be operated in a second mode of operation corresponding to a second configuration of the optical path,
wherein, in the second mode of operation of the display device, at least a part of the image generated by the projection module is visible to the user of the display device in a magnified manner with respect to the first mode of operation of the display device;
wherein the display device is configured to choose the first mode of operation or the second mode of operation of the display device based on an item of selection information
wherein the use of the display device is made more suitable for the user having impaired visual ability by choosing the first or second mode of operation of the display device depending on the item of selection information;
wherein the display device comprises a human-machine interface or the display device is associated with a human-machine interface, and via the human-machine interface, in response to an interaction of the user of the display device, the item of selection information is transmitted to the display device such that the display device is operated, either following the first mode of operation, or following the second mode of operation, depending on the item of selection information, wherein the item of selection information is generated following identification of the user of the display device; and
wherein the image generated by the projection module or a field of view of the user includes a first area and a second area, and a representation of an item of information in the first display area is varied or changed to result in an automatic representation of the item of information in the second display area when the item of information represented increases in size.

2. The display device as claimed in claim 1, wherein, in the second mode of operation of the display device, only a part of the image generated by the projection module is visible to the user of the display device.

3. The display device as claimed in claim 1, wherein, in the second mode of operation of the display device, the whole image generated by the projection module is visible to the user of the display device.

4. The display device as claimed in claim 1, wherein
the image generated by the projection module is an image comprising a first number of image elements (pixels) in a first direction of the image and comprising a second number of image elements (pixels) in a second direction of the image, and
in the second mode of operation of the display device, a third number of image elements in the first direction of the image and a fourth number of image elements in the second direction of the image is visible to the user of the display device, the third number of image elements being less than the first number of image elements and/or the fourth number of image elements being less than the second number of image elements.

5. The display device as claimed in claim 1, wherein the display device comprises a liquid crystal display (LCD) module.

6. The display device as claimed in claim 1, wherein the display device comprises a matrix display module.

7. The display device as claimed in claim 1, wherein the reflection element is an element positioned at a distance with respect to a windscreen of the motor vehicle.

8. The display device as claimed in claim 1, wherein the display device further comprises a measurement means, wherein the measurement means is configured to automatically measure a visual ability of the user in order to automatically obtain the item of selection information without interaction with the user.

* * * * *